United States Patent
Falk et al.

(10) Patent No.: US 10,166,876 B2
(45) Date of Patent: Jan. 1, 2019

(54) CHARGING DEVICE FOR CHARGING A VEHICLE ACCUMULATOR

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 329 days.

(21) Appl. No.: 13/979,616

(22) PCT Filed: Dec. 15, 2011

(86) PCT No.: PCT/EP2011/072892
§ 371 (c)(1),
(2), (4) Date: Jul. 12, 2013

(87) PCT Pub. No.: WO2012/095234
PCT Pub. Date: Jul. 19, 2012

(65) Prior Publication Data
US 2015/0073591 A1    Mar. 12, 2015

(30) Foreign Application Priority Data
Jan. 14, 2011  (DE) .................. 10 2011 002 707

(51) Int. Cl.
*H02J 7/00* (2006.01)
*B60L 11/18* (2006.01)

(52) U.S. Cl.
CPC ....... *B60L 11/1846* (2013.01); *B60L 2200/26* (2013.01); *B60L 2230/16* (2013.01); *B60L 2230/40* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01);
(Continued)

(58) Field of Classification Search
CPC ...... Y02T 90/14; Y02T 90/12; B60L 11/1846; B60L 11/1851
USPC .................................................. 320/104, 109
See application file for complete search history.

(56) References Cited

U.S. PATENT DOCUMENTS 5,499,181 A   3/1996  Smith
5,955,865 A   9/1999  Koike et al.
(Continued)

FOREIGN PATENT DOCUMENTS

CN    1195325    10/1998
CN    1625014    6/2005
(Continued)

OTHER PUBLICATIONS

Office Action dated Dec. 31, 2014 in corresponding Chinese Patent Application No. 201180065031.X.
(Continued)

*Primary Examiner* — Nathaniel Pelton
*Assistant Examiner* — Johali Torres Ruiz
(74) *Attorney, Agent, or Firm* — Slayden Grubert Beard PLLC (57) ABSTRACT

A vehicle accumulator connected to a charging device is charged by controlling a configurable charge program executed by a control unit of the charge device. The configurable charge program is obtained from a charge program memory, so that the vehicle accumulator can be charged in an optimal manner with an individual charging characteristic.

10 Claims, 5 Drawing Sheets

(52) U.S. Cl.
CPC ............ *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 6,286,127 B1* | 9/2001 | King | G05B 19/07 327/54 |
| 6,307,349 B1* | 10/2001 | Koenck | H01M 10/4257 320/112 |
| 8,035,252 B2 | 10/2011 | Ichikawa et al. | |
| 2004/0164711 A1* | 8/2004 | Hayashi | H02J 7/0055 320/134 |
| 2006/0028178 A1* | 2/2006 | Hobbs | B60L 3/0046 320/128 |
| 2006/0089733 A1 | 4/2006 | Dickinson et al. | |
| 2006/0130033 A1* | 6/2006 | Stoffels | G06F 8/61 717/166 |
| 2009/0021385 A1 | 1/2009 | Kelty et al. | |
| 2009/0195067 A1 | 8/2009 | Ichikawa et al. | |
| 2009/0218986 A1* | 9/2009 | Jarvinen | B60L 11/185 320/119 |
| 2010/0010698 A1* | 1/2010 | Iwashita | B60L 3/12 701/22 |
| 2010/0076825 A1 | 3/2010 | Sato et al. | |
| 2010/0156355 A1* | 6/2010 | Bauerle et al. | 320/145 |
| 2010/0217485 A1 | 8/2010 | Ichishi | |
| 2011/0021758 A1 | 1/2011 | Rother et al. | |
| 2011/0066309 A1* | 3/2011 | Matsuoka | B60L 11/1824 701/22 |
| 2012/0101755 A1* | 4/2012 | Hirasawa | 702/63 |

FOREIGN PATENT DOCUMENTS

| | | |
|---|---|---|
| CN | 101512869 | 8/2009 |
| DE | 102009045711 A1 | 4/2010 |
| DE | 102011002707.6 | 1/2011 |
| EP | 2 219 278 A1 | 8/2010 |

OTHER PUBLICATIONS

Office Action for German Patent Appl. No. 102011002707.6 dated Nov. 10, 2011.
International Search Report for PCT/EP2011/072892; dated Jul. 5, 2012.

* cited by examiner

CHARGING DEVICE FOR CHARGING A VEHICLE ACCUMULATOR

CROSS REFERENCE TO RELATED APPLICATIONS

This application is the U.S. national stage of International Application No. PCT/EP2011/072892, filed Dec. 15, 2011 and claims the benefit thereof. The International Application claims the benefit of German Application No. 10 2011 002 707.6 filed on Jan. 14, 2011, both applications are incorporated by reference herein in their entirety.

BACKGROUND

Described below are a method and a device for charging a vehicle accumulator, in particular a method and a device for providing charge programs or charging profiles for electric vehicles.

Electric vehicles have chargeable vehicle accumulators which can be electrically charged at a charging station. In this situation different charging modalities can be implemented. The charging operation can depend on a charging characteristic of the vehicle accumulator. It is furthermore possible that the charging operation or the charging profile is designed as dependent on a tariff or on a user profile associated with the vehicle accumulator. There is a great variety of different types of vehicle accumulators which each require a certain physical charging characteristic. Furthermore, there are a great many different user profiles and possible charging tariffs which means that it has not hitherto been possible in the case of known charging posts to provide the vehicle accumulator in question with an accumulator-specific charging profile.

SUMMARY

Described below are a method and a device which ensure that an accumulator-specific charging profile or charge program can be provided in the case of the particular charging station to which the vehicle accumulator is connected.

The charging device charges a vehicle accumulator connected thereto under control of a configurable charge program which is provided by a charge program memory of a control unit of the charging device, and executed by control unit for charging the vehicle accumulator.

In a possible embodiment of the charging device, the charging device has an authentication unit which is intended for authentication of the vehicle accumulator with respect to the charging device.

In a possible embodiment of the charging device, a charge program stored in the charge program memory is transferred to the control unit of the charging device from the charge program memory depending on the accumulator type of the vehicle accumulator connected to the charging device and/or on a result of an authentication.

In a possible embodiment of the charging device, the charge program memory is located in the charging device.

In a further possible embodiment of the charging device, the charge program memory is located in a charge data server connected to the charging device by way of a data network. The charge data server in question can be a charge data server of the manufacturer of the particular vehicle accumulator.

In a further possible embodiment of the charging device, the charge program memory is located inside the connected vehicle accumulator.

In a possible embodiment the charging device is provided in a charging post.

In an alternative embodiment the charging device is located in an electric vehicle.

In a possible embodiment of the charging device, at least one associated charge program is stored in each case in the charge program memory for the different vehicle accumulators.

In a possible embodiment different types of charge programs are provided for each vehicle accumulator or each vehicle accumulator type.

In a possible embodiment the different charge programs include for example a fast charge program, a normal charge program or a buffer charge program for the particular vehicle accumulator.

In this situation a fast charge program may be provided for charging the vehicle accumulator with a high charging current in a predetermined short period of time.

Furthermore, a normal charge program is provided for charging the vehicle accumulator with a low charging current in a predetermined longer period of time.

Furthermore, a buffer charge program can provided for the particular vehicle accumulator.

Furthermore, it is possible to provide different charge programs for different charging tariffs.

In a possible embodiment of the charging device, the charge program for charging the particular vehicle accumulator is transferred from the charge program memory to the control unit of the charging device in cryptographically encrypted form after authentication of the vehicle accumulator has taken place.

In a possible embodiment of the charging device, the control unit of the charging device obtains from a server of the manufacturer of the particular vehicle accumulator a cryptographic key for decryption of the charge program received in encrypted form.

The control unit of the charging device subsequently executes the charge program decrypted by the cryptographic key of the vehicle accumulator manufacturer obtained in order to charge the vehicle accumulator connected to the charging device.

The method for charging a vehicle accumulator by a charging device includes reading a configurable charge program from a charge program memory, depending on the vehicle accumulator, and executing the configurable charge program by a control unit of the charging device to charge the vehicle accumulator.

In a possible embodiment of the method, after connection to the charging device the vehicle accumulator firstly authenticates itself with respect to the charging device.

In a possible embodiment of the method, the charge program for charging the vehicle accumulator is selected depending on the result of an authentication and/or on the accumulator type of the vehicle accumulator and is read out from the charge program memory and is subsequently transferred to the control unit of the charging device for execution.

In this situation, in a possible embodiment the charge program for charging the vehicle accumulator can be transferred in cryptographically encrypted form to the control unit of the charging device.

With regard to the embodiment, in a possible embodiment variant the control unit of the charging device can obtain a cryptographic key from a server of the manufacturer of the particular vehicle accumulator in order to decrypt the charge program received in encrypted form.

The charge program received in encrypted form is subsequently decrypted with the aid of the received cryptographic key and executed in order to charge the vehicle accumulator.

Embodiments of the charging device and the method for charging a vehicle accumulator connected thereto will be described in the following with reference to the attached figures.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
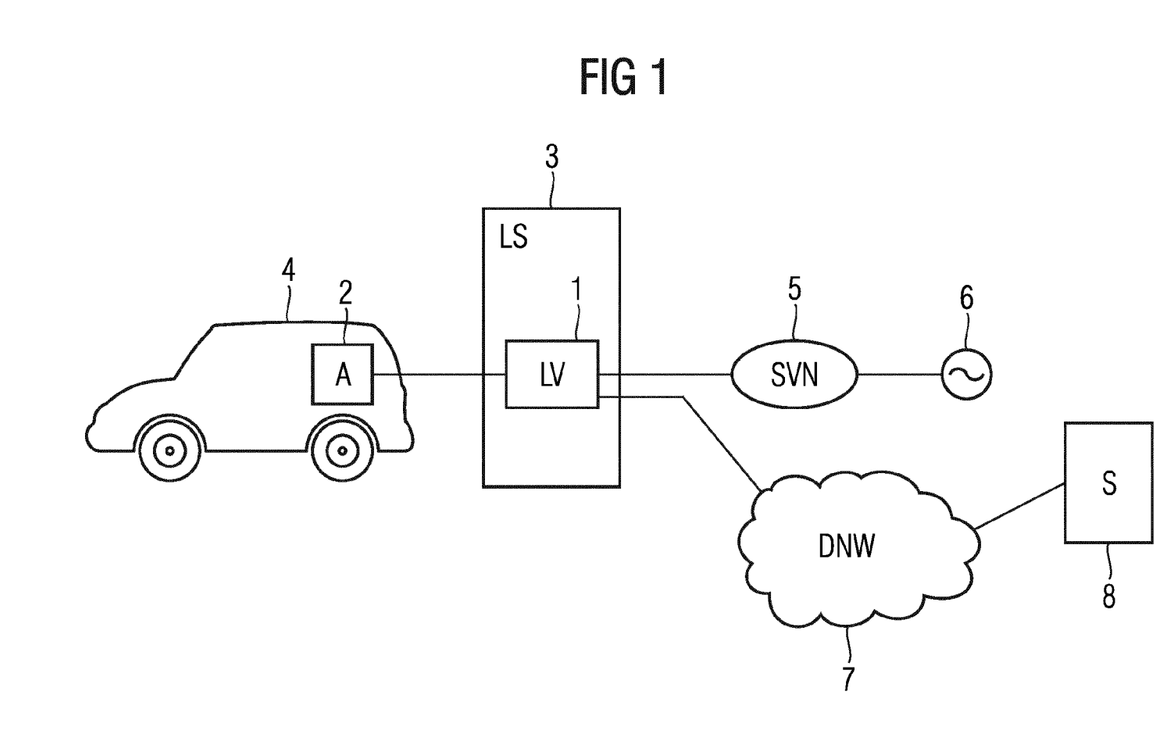
FIG. 1 is a block diagram of an exemplary embodiment of an arrangement which has a charging device for charging a vehicle accumulator.

As can be seen from FIG. 1, with regard to the exemplary embodiment illustrated therein the charging device 1 for charging a vehicle accumulator 2 connected thereto is situated in a charging post 3. In the example illustrated in FIG. 1 the vehicle accumulator 2 is situated inside an electric vehicle 4. Alternatively, the vehicle accumulator 2 in question can also be an interchangeable vehicle accumulator which can be connected directly to the charging post 3. The charging device 1 is connected to a power supply network 5 and draws electrical energy by way of the power supply network 5 in order to charge the vehicle accumulator 2. In the example illustrated in FIG. 1 the electrical energy is produced by a generator 6. Furthermore, the charging device 1 can be connected by way of a data network 7 to a server 8, in which case the latter can for example be a server of a vehicle accumulator manufacturer. Furthermore, the server 8 in question can be the server of a charging station operator. A plurality of charging stations 3 for charging vehicle accumulators can be connected to the power supply network 5 and to the data network 7. Each charging post 3 has at least one charging connection for connection of at least one accumulator 2.

With regard to the embodiment variant illustrated in FIG. 1, the charging device 1 for charging the vehicle accumulator is situated inside the charging post 3. The vehicle accumulator 2 is charged by the charging device 1 under the control of a configurable charge program, in which case the charge program is transferred from a charge program memory to a control unit integrated in the charging device 1, which subsequently executes the received charge program for charging the vehicle accumulator 2. In a possible embodiment, in addition to the charge control unit the charging device 1 also has an authentication unit which is intended for authentication of a vehicle accumulator with respect to the charging device 1. In a possible embodiment, the charge program memories can likewise be situated inside the charging device 1 or the charging post 3. Alternatively, it is possible that the charge program memory is actually provided in the vehicle accumulator 2 and is read out by the charging device 1 by way of a data interface. The data interface can be provided parallel to the current charging interface illustrated in FIG. 1. Alternatively, the charge program is transferred by way of the current charging interface from the vehicle accumulator 2 to the charging device 1. In a further embodiment variant the charging device 1 obtains the charge program from a charge program memory which is situated in a remote charge data server 8 or in a database to which a corresponding charge data server has access. In the exemplary embodiment illustrated in FIG. 1 the charge program memory can for example be provided in the server 8. In this embodiment the charging device 1 obtains the charge program from the server 8 by way of a corresponding request. The server 8 is for example a server of a vehicle accumulator manufacturer which has manufactured the vehicle accumulator 2.

In a possible embodiment a charge program stored in the charge program memory is selected depending on the accumulator type of the vehicle accumulator 2 connected to the charging device 1. For this purpose the charging device 1 has a recognition facility which makes it possible to recognize the connected vehicle accumulator 2 or the type thereof. In a possible embodiment the connected vehicle accumulator 2 transfers an appropriate type identification to the charging device 1. In this situation the selection of the charge program can additionally take place on the basis of the result of an authentication delivered by the authentication unit of the charging device 1.

One charge program or a plurality of different charge programs can be stored for each vehicle accumulator or each vehicle accumulator type. For example, for the vehicle accumulator 2 a fast charge program is provided for charging the vehicle accumulator with a high charging current in a predetermined short period of time and also a normal charge program for charging the vehicle accumulator 2 with a relatively low charging current in a predetermined longer period of time. Furthermore, a buffer charge program can additionally be provided for the vehicle accumulator 2. For example, the charging time using a fast charge program is 3 hours at a charging current of 15 A and for example a charging voltage of 15.4 V. Furthermore, the charging time using a normal charge program 2 B is 8 hours at a relatively low charging current of 2 A and a charging voltage of 15.4 V. When using a buffer charge program the charging current is for example 200 mA at a charging voltage of 15.4 V. In another variant a high-voltage fast charge at a charging voltage of for example 400V and a charging current of 60 A is possible.

In a possible embodiment variant the charge program is transferred unencrypted from the charge program memory in the charging device 1. In an embodiment, the transfer of the charge program from the charge program memory to the charging device 1 takes place with cryptographic protection. In this situation the charge program for charging the vehicle accumulator 2 can be transferred in cryptographically encrypted form from the charge program memory after authentication of the vehicle accumulator 2 with respect to the charging device 1 has taken place. In this embodiment the control unit of the charging device 1 thus receives the charge program for charging the vehicle accumulator 2 in encrypted form. In this embodiment the control unit of the charging device 1 obtains from a server 8 of the manufacturer of the particular vehicle accumulator a cryptographic key for decryption of the charge program received in encrypted form in a possible embodiment. In this situation, the charge program is thus firstly decrypted by the cryptographic key received and subsequently executed by the control unit of the charging device 1 in order to charge the vehicle accumulator 2. As a result of the encrypted transfer of the charge program it is possible to achieve an increased level of protection against undesired manipulation.

Figure 2A:
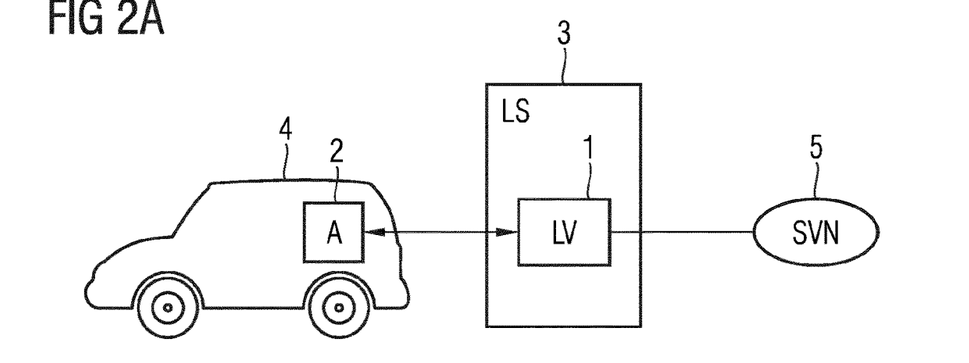
FIGS. 2a, 2b, 2c are block diagrams of different embodiment variants for the arrangement of a charging device.
Figure 2B:
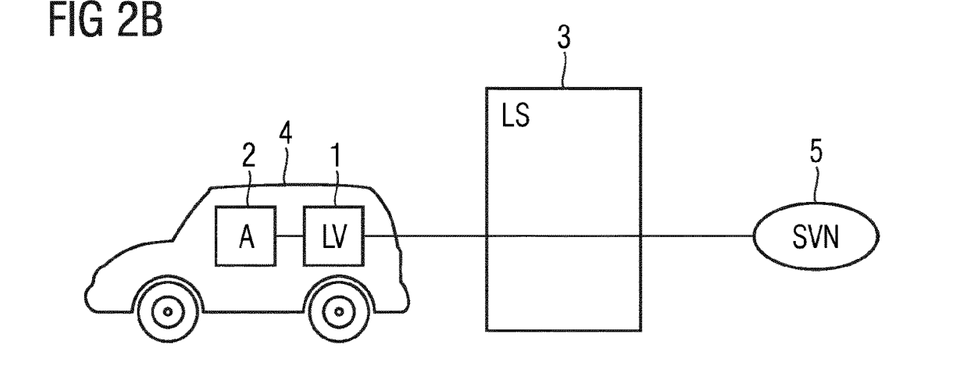
Figure 2C:
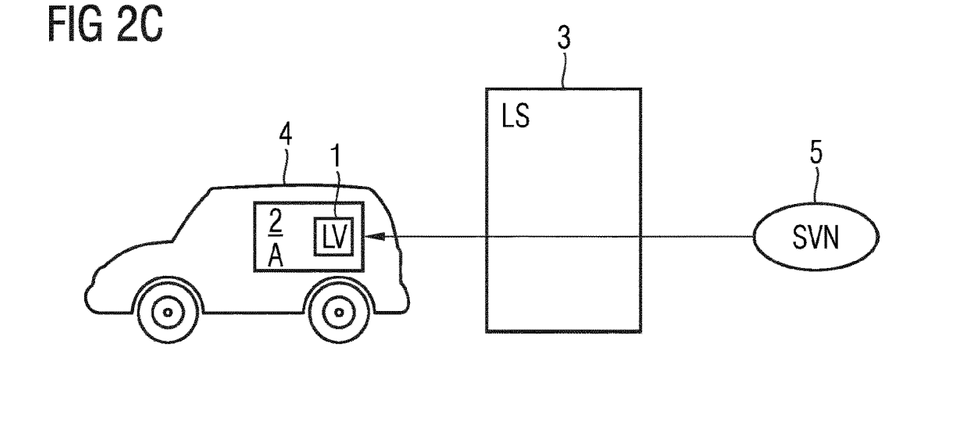

FIGS. 2A, 2B, 2C show different variants in which the charging device 1 is fitted at different locations.

The arrangement illustrated in FIG. 2A corresponds to the embodiment illustrated in FIG. 1. In the embodiment variant the charging device 1 is situated in a charging post 3.

With regard to the embodiment variant illustrated in FIG. 2B the charging device 1 is situated inside an electric vehicle 4 and controls the charging of the vehicle accumulator 2 in accordance with the associated charge program.

With regard to the embodiment variant illustrated in FIG. 2C the charging device 1 is situated inside the vehicle accumulator 2 to be charged as an integrated component, which means that the vehicle accumulator 2 is readily interchangeable.

Figure 3:
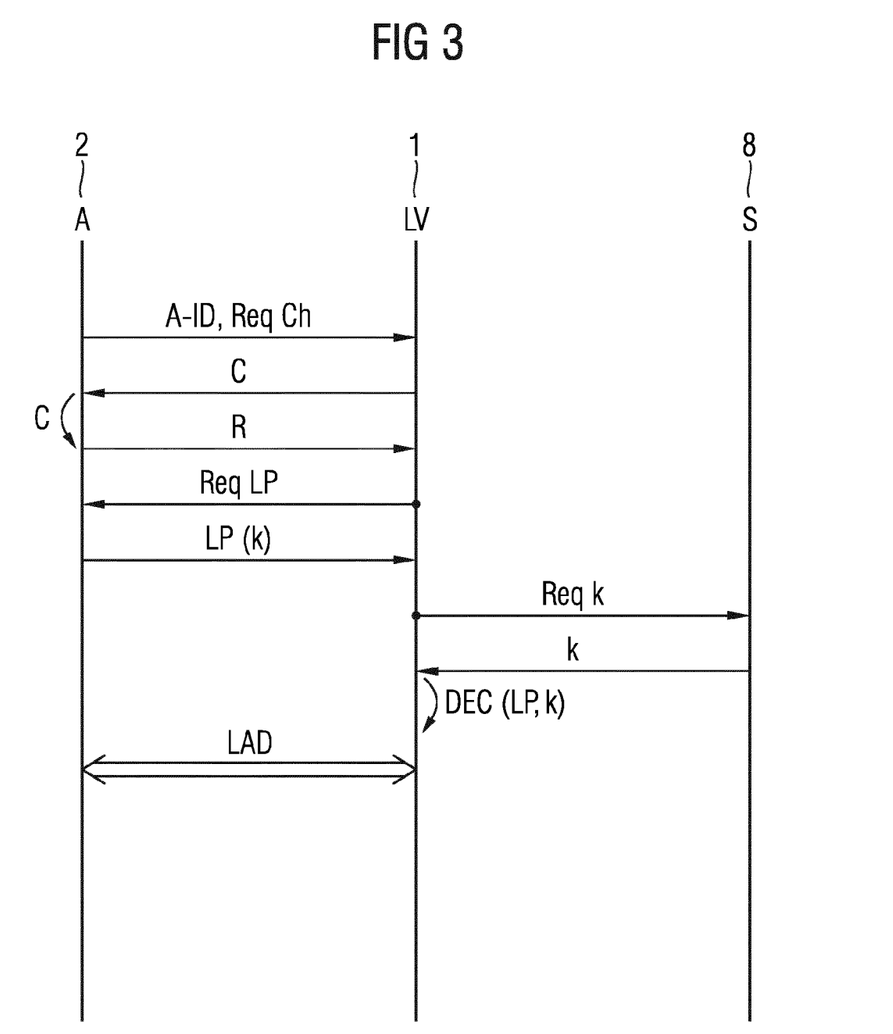
FIG. 3 is a signal diagram by way of explanation of an exemplary embodiment of the method for charging a vehicle accumulator.

FIG. 3 shows a signal diagram by way of explanation of the operation of the method for charging a vehicle accumulator 2. In the embodiment variant illustrated in FIG. 3 the charging device 1 obtains the charge program from a data memory of the vehicle accumulator 2. After being connected to the charging post the vehicle accumulator 2 to be charged 3 initially transfers an accumulator ID and requests the charging post 3 to initiate a charging operation. In the exemplary embodiment illustrated in FIG. 3 the connected vehicle accumulator 2 initially identifies itself by a challenge-response method with respect to the charging device 1 which sends the vehicle accumulator 2 a challenge C and checks the response calculated by the vehicle accumulator 2. When the authentication of the connected vehicle accumulator 2 has been successfully completed, the charging device 1 asks the vehicle accumulator 2 for the charge program stored in its data memory. The charge program is subsequently, as illustrated in FIG. 3, transferred by the vehicle accumulator 2 with a key K in cryptographically encrypted form to the charging device 1. As soon as the charging device 1 has received the charge program transferred in encrypted form from the vehicle accumulator 2, the charging device 1 requests a corresponding key K from a server 8 of the accumulator manufacturer for decryption of the charge program. On receipt of the key K from the server 8, the charge program received in encrypted form is decrypted with the aid of the key. A charging operation of the vehicle accumulator 2 subsequently takes place under the control of the decrypted charge program or charging profile.

With regard to the exemplary embodiment illustrated in FIG. 3, a charge program is thus obtained from a program memory of the vehicle accumulator 2 by the charging device 1. In an alternative embodiment the charging device 1 receives the charge program LP from a server 8 of the particular vehicle accumulator manufacturer in encrypted or unencrypted form.

In a further variant the charge program of the charging device 1 is already available in an internal data memory. In this embodiment variant, simply a charge program is selected on the basis of an accumulator type or on the basis of the received accumulator ID.

In a further possible embodiment the charging post 3 has a user interface which enables the user or driver of the electric vehicle 4 to additionally influence the selection of the charge program. For example, the user can choose between a normal charge program, a fast charge program or a buffer charge program. In a further possible embodiment the charge program is configurable, wherein certain parameters of the configurable charge program can be set by the user by way of the user interface of the charging post 3 within permissible ranges. For example, the user can set the charging time or the charging current amplitude. Furthermore, the charging operation can be performed depending on the time of day or a certain user tariff.

With regard to the method, the charging of the vehicle accumulator 2 takes place in accordance with a charging profile or charge program, wherein the charge program is selected and activated depending on an identification or an authentication of the connected vehicle accumulator 2. This means that charge programs which could pose a hazard if used with a different accumulator type, for example result in an explosion of the vehicle accumulator, are only used when an original vehicle accumulator is connected to the charging device 1. Furthermore, through appropriate choice of a charge program it is possible to ensure that a particularly advantageous charging is performed under the control of the charge program, in other words charging which is particularly efficient, fast and gentle on the vehicle accumulator 2.

In a possible embodiment the vehicle accumulator 2 to be charged initially transfers to the charging device 1 a device ID in order to identify itself. Based on the device ID or identifier, the charge profile data for the specific vehicle accumulator type of the charging station can be downloaded from a server 8 or directly from the vehicle accumulator 2. Charging by the charging device 1 then takes place in accordance with the selected charging profile or charge program.

In this situation the vehicle accumulator 2 may identify itself to afford protection against manipulation, in other words it authenticates itself with respect to the charging device 1. Depending on the result of the accumulator identification or authentication, the charge program is chosen and activated, for example in the case of a successful authentication of the vehicle accumulator 2 a fast charge, a normal charge, a buffer charge or a guaranteed charging time. In the case of a failed authentication of the vehicle accumulator 2, a charge refusal can occur or only a certain charge program can be executed, for example a normal charge or buffer charge. Furthermore, in the case of a failed authentication for example only a charge up to a certain maximum value or up to a maximum possible nominal value, 50% for example, can be performed.

In a possible embodiment of the charging device 1, information or address information as to where the charge program or the charge profile data can be obtained from by the charging device 1 is stored directly on the vehicle accumulator 2 itself and can be read out from there. For example, the vehicle accumulator 2 can provide an appropriate URL address from which the charging device 1 can obtain an appropriate charge program. In a further possible variant the charging profile is available as an XML file or text file. In an embodiment, the charge program is available in the form of an executable charging operation control program, for example as Java byte code. In a further possible variant the executable charge program is stored directly on the vehicle accumulator 2 and can be read out there and subsequently executed by the charging device 1. In a further possible embodiment the charge program is protected cryptographically by an EDRM key. In this case the EDRM protection can be coupled directly to the authentication of the vehicle accumulator 2. An EDRM license server only issues a corresponding license to the charging device 1 for example which allows the charging device 1 to use the charge program if the charging post 3 proves to the license server that an original accumulator is connected to the charging station 3. In this way it is possible to ensure that only a certain combination of accumulator and charge program can always be used. This allows a vehicle accumulator manufacturer to provide and to protect series-specific charge routines or charge programs.

Figure 4:
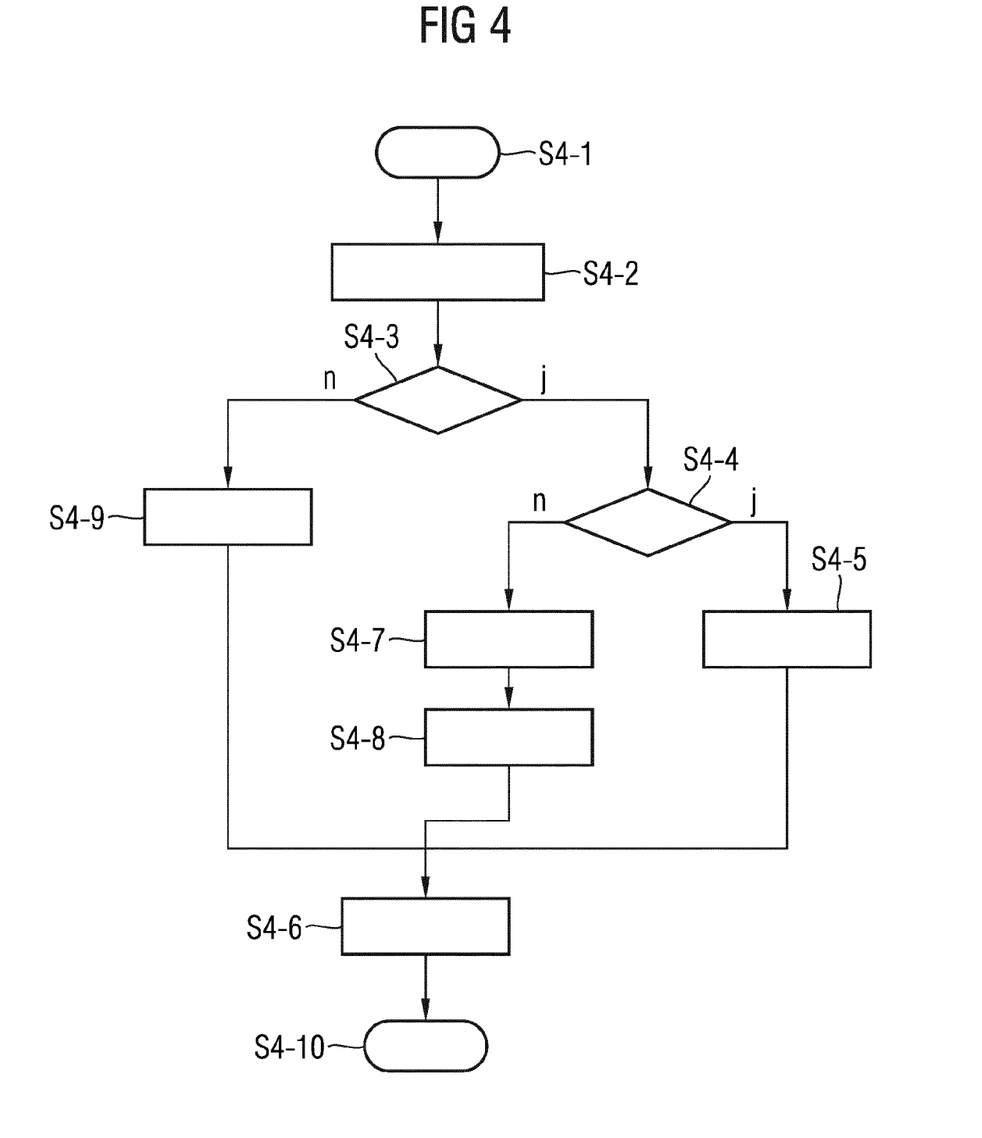
FIG. 4 is a flowchart by way of illustration of a possible embodiment variant of the method for charging a vehicle accumulator.
Figure 5:
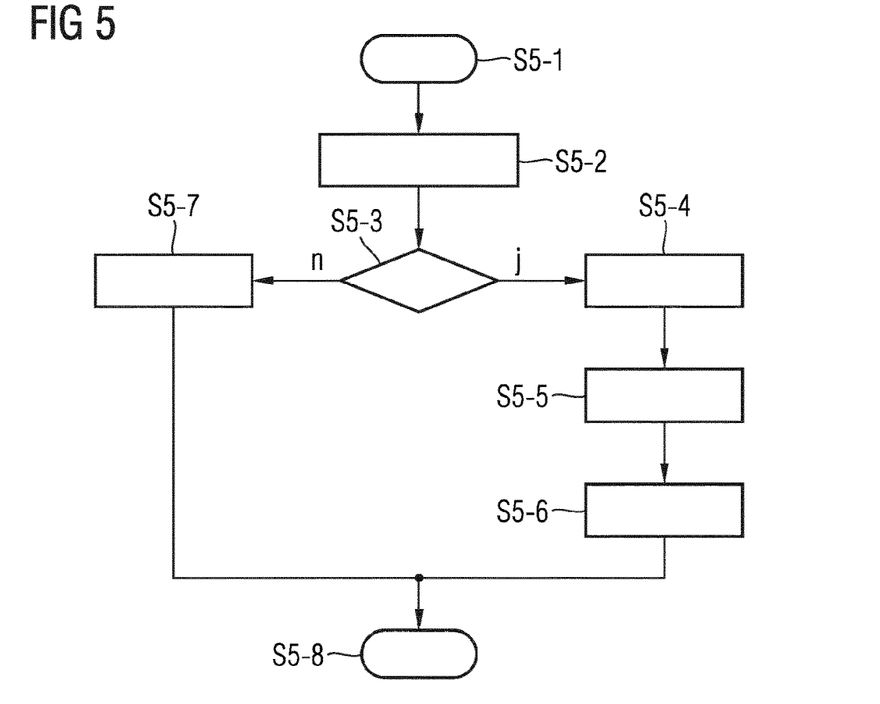
FIG. 5 is a flowchart by way of illustration of a further embodiment variant of the method for charging a vehicle accumulator.
Figure 6:
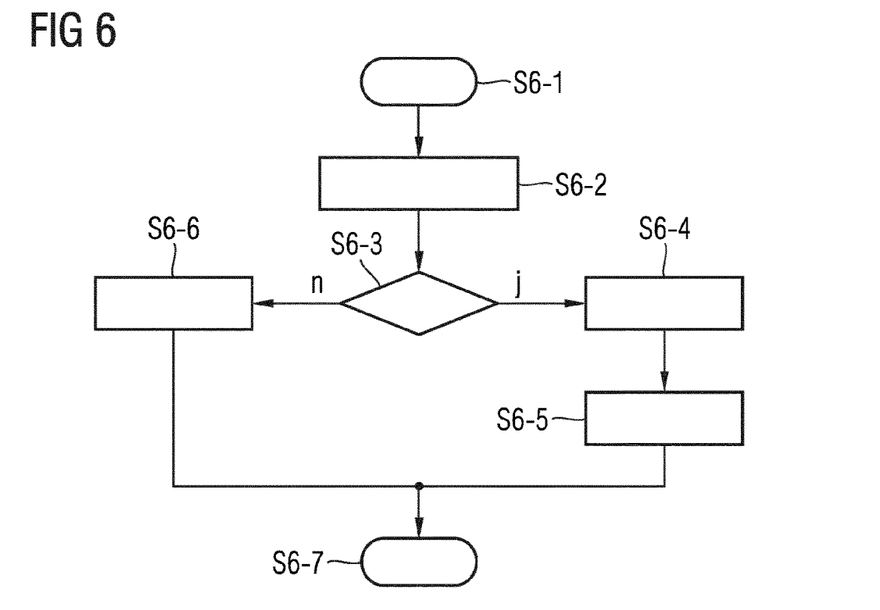
FIG. 6 is a flowchart by way of illustration of a further embodiment variant of the method for charging a vehicle accumulator.

The flowcharts in FIGS. 4, 5, 6 show different embodiment variants for charging a vehicle accumulator 2 by the charging device 1. With regard to the embodiment variant according to FIG. 4, following the start S 4-1 an identification of the vehicle accumulator 2 by the charging device 1 takes place initially in S 4-2. In S 4-3 a check is made as to whether the identification of the vehicle accumulator 2 has been completed successfully. If the identification or the authentication of the vehicle accumulator 2 is successful, in S 4-4 a check is furthermore made as to whether the charge program is available locally or not. If this is the case, in S 4-5 the charge program available in the local data memory is selected and the charging of the vehicle accumulator 2 is subsequently performed in S 4-6 by the control unit of the charging device 1. If the charging profile or the charge program is not available locally, in S 4-7 one or more charge programs are downloaded by the charging device 1 for the particular vehicle accumulator 2, for example from a program memory of a server of the vehicle accumulator manufacturer. A selection or choice of the downloaded charge program is subsequently made in S 4-8. If the connected vehicle accumulator 2 cannot be successfully authenticated, in the case of the exemplary embodiment illustrated in FIG. 4 a standard charge program for example can be chosen by the charging device 1 in S 4-9 and subsequently executed in S 4-6. The operation ends at S 4-10.

FIG. 5 shows a further embodiment variant for charging the vehicle accumulator 2 by the charging device 1. Following the start S 5-1, in S 5-2 the authenticity of the connected vehicle accumulator 2 is checked by the charging device 1 of the charging post 3. In S 5-3 a check is made as to whether the vehicle accumulator 2 has been successfully authenticated. If this is the case, in S 5-4 a charging operation for the vehicle accumulator 2 can be downloaded by the charging device 1. If the transfer of the charge program takes place in encrypted form, downloading of a cryptographic key furthermore takes place in S 5-5 for decrypting the charge program contained in encrypted form, for example from a server of the vehicle accumulator manufacturer. The charging operation is subsequently performed in S 5-6 under the control of the decrypted charge program. If the check in S 5-3 determines that the vehicle accumulator 2 could not be authenticated or identified, in the exemplary embodiment illustrated in FIG. 5 the selection of a trickle charge or buffer charge takes place for example in S 5-7 through selection of an appropriate buffer charge program. The operation ends in S 5-8.

FIG. 6 shows a further exemplary embodiment of a charging method.

Following the start S 6-1, a check on the authenticity of the connected vehicle accumulator 2 by the charging device 1 of the charging post 3 takes place initially in S 6-2. In S 6-3 a check is then made as to whether the connected vehicle accumulator 2 could be successfully identified or authenticated. If this is the case, in the exemplary embodiment illustrated in FIG. 6 loading of an appropriate charge program of the vehicle accumulator 2 takes place from a program memory which is available in a server of the vehicle accumulator manufacturer. As soon as the charging device has received the charge program from the server of the vehicle accumulator manufacturer, the charging operation takes place under the control of the charge program or the charge application in S 6-5. If the vehicle accumulator 2 could not be successfully authenticated or identified, a trickle charge or buffer charge of the vehicle accumulator 2 takes place in S 6-6 through execution of an appropriate buffer charge program. The operation ends in S 6-7.

The method and the device for charging a vehicle accumulator 2 connected thereto permit a flexible handling of charge programs or charging profiles depending on the vehicle accumulator type and on an authenticity check on the vehicle accumulator 2. Optimized charging profiles or charge programs can thus be provided which can then be used only for the corresponding vehicle accumulator 2. A physically identical vehicle accumulator can be differentiated by of possible charging profiles or charge programs, for example an inexpensive vehicle accumulator with standard charging or a premium vehicle accumulator with accelerated charging. In addition, the method also allows charge programs or charge program applications to be downloaded during offline operation of the charging post 3 by of an internal memory in the vehicle accumulator 2. Furthermore, standard charging of the vehicle accumulator 2 is also possible in situations where the authenticity of the vehicle accumulator 2 cannot be verified. The method may use an interchangeable vehicle accumulator 2 into which is integrated an appropriate charging device 1 for charging the vehicle accumulator. Furthermore, the method may charge an electric vehicle in which is situated a charging device 1 for charging vehicle accumulator 2. The vehicle 4 in question need not necessarily be an electrically powered road vehicle. The vehicle 4 in question can also be a rail vehicle, an aircraft or a water craft. Further variants are possible. For example, a user of the vehicle can have a plurality of different charge programs and corresponding tariffs displayed by way of a user interface, for example a graphical user interface on the charging post 3, and subsequently manually select a charge program suitable for his purposes. The selection of the charge program can thus on the one hand be made manually by the user of the vehicle or automatically by the charging device 1 on the basis of certain criteria, in particular the vehicle accumulator type. Further selection criteria are a user tariff for the vehicle user, a tariff linked to the vehicle accumulator 2 and also further parameters, in particular environmental parameters which are captured by sensors in the charging post 3. For example, the charging operation or the charge program can be selected depending on the ambient temperature. Furthermore, the charge program can be selected depending on the amplitude of the supply current provided by the power supply network 5.

In a possible embodiment variant, if the charging device 1 determines that the connected vehicle accumulator 2 in question is a plagiarized copy of a manufacturer's product it can refuse the charging operation and where applicable send an appropriate message to the corresponding vehicle accumulator manufacturer.

The vehicle accumulator 2 illustrated in FIG. 1 need not necessarily be situated in a vehicle 4. In a possible embodiment variant a plurality of accumulators 2, in particular vehicle accumulators, can be charged in parallel at one charging post 3. The accumulators 2 in question can be any desired accumulators which for example can also be inserted in other units.

The downloading of a charge program can, as illustrated in FIG. 1, take place in wired fashion by way of a data network from a server 8. The server 8 can be a central server for various manufacturers or charging station operators or a server of one vehicle accumulator manufacturer. Furthermore, a charge program can also be downloaded in wireless fashion by way of a radio network if required. The method also allows the operation of charging stations 3 which have no connection to a data network 7. With regard to a further possible embodiment variant, the charge program is loaded if required by way of a portable terminal device of the user, for example a mobile telephone, and made available from there to the charging device 1. In this embodiment the charging device 1 has an interface for downloading the charge program or the charge program application from a cellular mobile telephone of the user of the electric vehicle 4. The user of a vehicle such as an Audi A6 can for example download appropriate charge programs for the different vehicle accumulators of his vehicle from a home page of the vehicle manufacturer and make available the charge programs to a charging device 1 as required in order to perform the charging operation. In this embodiment variant the charge program is initially downloaded into a program memory of a mobile terminal device of the user and subsequently transferred to the charging device 1 by way of an interface between terminal device and charging device 1 for execution of the charge program.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A charging device for charging each of a plurality of different types of vehicle accumulators, the charging device comprising:
   a control unit configured to execute a plurality of different predetermined charge programs corresponding with the plurality of different types of vehicle accumulators, each predetermined charging program being executable by the control unit to control charging of a respective type of vehicle accumulator; and
   an accumulator recognition unit configured to, during connection of a particular type of a vehicle accumulator to the charging device via a communication link:
      receive, from the vehicle accumulator via the communication link, accumulator identification information indicating the particular type of vehicle accumulator connected to the charging device; and
      identify the particular type of vehicle accumulator currently connected to the charging device based on the received accumulator identification information; and
   wherein the control unit is further executable to:
      access, from the vehicle accumulator via the communication link, a particular predetermined charge program corresponding with the particular type of vehicle accumulator identified by the accumulator recognition unit;
      wherein the particular predetermined charge program is transferred to the control unit in cryptographically encrypted form;
      in response to accessing the particular predetermined charge program from the vehicle accumulator in cryptographically encrypted form, automatically request a corresponding key for decryption from a server associated with a manufacturer of the particular type of vehicle accumulator;
      obtain the decryption key from the server associated with the manufacturer of the particular type of vehicle accumulator, and use the decryption key to decrypt the predetermined charge program received from the vehicle accumulator; and
      execute the particular predetermined charge program to control charging of the particular type of vehicle accumulator.

2. The charging device as claimed in claim 1, further comprising an authentication unit performing authentication of the vehicle accumulator prior to charging by the charging device.

3. The charging device as claimed in claim 1, wherein:
   plurality of different predetermined charge programs corresponding with the plurality of different types of vehicle accumulators are stored in a charge program memory; and
   accessing, by said control unit the particular predetermined charging program corresponding with the particular type of vehicle accumulator comprises selecting the particular charge program stored in the charge program memory depending at least one of the particular vehicle accumulator type identified by the accumulator recognition unit.

4. The charging device as claimed in claim 3, wherein the charge program memory is provided in the vehicle accumulator.

5. The charging device as claimed in claim 4, wherein the charge data server connected to the charging device is manufactured by a manufacturer of the vehicle accumulator.

6. The charging device as claimed in claim 1, wherein the charging device is provided in one of a charging post and an electric vehicle.

7. The charging device as claimed in claim 1, wherein multiple sets of predetermined charge programs are stored in the charge program memory for different vehicle accumulators of the same type of vehicle accumulator, each set including:
   a fast charge program for charging the respective vehicle accumulator with a high charging current in a first predetermined period of time,
   a normal charge program for charging the respective vehicle accumulator with a low charging current in a second predetermined period of time longer than the first predetermined period of time, and
   a buffer charge program.

8. A method for charging each of a plurality of different types of vehicle accumulators by a charging device using a plurality of different predetermined charge programs corresponding with the plurality of different types of vehicle accumulators, the method comprising, for each of the different types of vehicle accumulators:

connecting a particular type of vehicle accumulator to the charging device via a communication link:

receiving, at an accumulator recognition unit of the charging device, from the vehicle accumulator via the communication link, accumulator identification information indicating the particular type of vehicle accumulator connected to the charging device;

identifying, by the accumulator recognition unit, based on the received accumulator identification information, the particular type of vehicle accumulator;

obtaining, by a control unit of the charging device, from a charge program memory of the vehicle accumulator via the communication link, a particular predetermined charge program, from the plurality of different predetermined charge programs, that corresponds with the particular type of vehicle accumulator identified by the accumulator recognition unit;

wherein the particular predetermined charge program is transferred to the control unit in cryptographically encrypted form;

in response to obtaining the particular predetermined charge program from the vehicle accumulator in cryptographically encrypted form, automatically requesting a corresponding key for decryption from a server associated with a manufacturer of the particular type of vehicle accumulator;

obtaining the decryption key from the server associated with the manufacturer of the particular type of vehicle accumulator;

using the decryption key to decrypt the charge program received from the vehicle accumulator; and executing the particular predetermined charge program by the control unit of the charging device to charge the particular type of vehicle accumulator.

9. The method as claimed in claim 8, further comprising authenticating the vehicle accumulator after connection of the vehicle accumulator to the charging device.

10. The method as claimed in claim 9, wherein the charge program memory stores the plurality of different predetermined charge programs corresponding with the plurality of different types of vehicle accumulators, and the method further comprising selecting, by the control unit, the particular predetermined charge program based on the particular type of vehicle accumulator identified by the accumulator recognition unit, and accessing the selected particular predetermined charge program from the charge program memory.

* * * * *